(12) United States Patent
Kopetzky

(10) Patent No.: US 6,527,298 B2
(45) Date of Patent: Mar. 4, 2003

(54) SAFETY BELT ARRANGEMENT

(75) Inventor: Robert Kopetzky, Lonsee (DE)

(73) Assignee: Takata (Europe) Vehicle Safety Technology GmbH, Ulm (DE)

(*) Notice: Subject to any disclaimer, the term of this patent is extended or adjusted under 35 U.S.C. 154(b) by 0 days.

(21) Appl. No.: 09/845,323

(22) Filed: May 1, 2001

(65) Prior Publication Data
US 2002/0047256 A1 Apr. 25, 2002

(30) Foreign Application Priority Data
May 3, 2000 (DE) .......................... 100 21 382

(51) Int. Cl.$^7$ .............................................. B60R 22/46
(52) U.S. Cl. ...................... 280/806; 280/808; 297/483; 297/480
(58) Field of Search ........................... 280/801.1, 801.2, 280/804, 806, 807, 808; 297/483, 470, 480

(56) References Cited

U.S. PATENT DOCUMENTS

| | | | | |
|---|---|---|---|---|
| 3,901,531 A | * | 8/1975 | Prochazka | 280/150 |
| 4,135,737 A | * | 1/1979 | Scholz et al. | 280/747 |
| 4,152,025 A | * | 5/1979 | Bendler et al. | 297/386 |
| 4,166,642 A | * | 9/1979 | Jahn et al. | 280/806 |
| 4,173,357 A | * | 11/1979 | Jahn et al. | 280/808 |
| 4,615,540 A | * | 10/1986 | Sedlmayr et al. | 280/806 |
| 4,627,639 A | * | 12/1986 | Sedlmayr et al. | 280/808 |
| 4,801,156 A | * | 1/1989 | Escaravage | 280/808 |
| 4,846,498 A | * | 7/1989 | Fohl | 280/808 |
| 5,102,166 A | * | 4/1992 | Bogner | 280/801.2 |
| 5,261,908 A | * | 11/1993 | Verellen et al. | 280/801 |
| 5,294,150 A | * | 3/1994 | Steffens, Jr. | 280/801 |
| 5,609,367 A | * | 3/1997 | Eusebi et al. | 280/808 |
| 5,628,529 A | * | 5/1997 | Golz et al. | 280/801.2 |
| 5,779,273 A | * | 7/1998 | Schmidt | 280/801.2 |
| 5,884,940 A | * | 3/1999 | Baumann et al. | 280/801.2 |
| 6,164,699 A | * | 12/2000 | Paschek | 280/801.2 |
| 6,334,629 B1 | * | 1/2002 | Griesemer et al. | 280/801.2 |

* cited by examiner

Primary Examiner—Paul N. Dickson
Assistant Examiner—Deanna Draper
(74) Attorney, Agent, or Firm—Foley & Lardner

(57) ABSTRACT

A safety belt arrangement for motor vehicles. The arrangement includes a safety belt and a belt roller from which the belt is retracted and withdrawn. The safety belt arrangement also includes a belt deflection apparatus that includes a deflection member. The belt is guided from the belt roller to the deflection member so that the belt can be deflected as it approaches the passenger. The deflection member moves away from the passenger in the case of an accident due to a force applied by a spring. Normally, the deflection member is retracted against the spring force by a retainer mechanism. The retainer mechanism releases the deflection member in the event of an accident. The resulting tensile force applied to the belt moves the passenger back into the normal seated position.

10 Claims, 2 Drawing Sheets

SAFETY BELT ARRANGEMENT

BACKGROUND

The invention relates to a safety belt arrangement for motor vehicles. In particular, the invention relates to safety belts having a pretensioner mechanism.

A safety belt arrangement of this kind is known from DE 1 99 57 749 A1 (incorporated by reference herein), in which the belt deflection apparatus is formed as a belt tautener in that it is provided at a movement production apparatus which can be triggered in the event of danger, which is secured at the vehicle body and which on triggering displaces the belt deflection apparatus or a part of the latter abruptly in the belt tautening direction, with the belt deflection apparatus comprising a belt deflection roller.

In conventional safety belt systems, a retraction of the safety belt takes place after a collision through the usual wind-up function of the belt winder alone, which requires a relatively large amount of time on the order of magnitude of 1 sec. In addition, the holding force which is achieved by the belt winder and which is on the order of magnitude of 2 to 10 N is too low in order to bring the passenger back into the normal seated position after a collision and to hold him there during a secondary collision.

SUMMARY OF THE INVENTION

An object of the present invention is to create a safety belt arrangement in which after an accident-caused acceleration the passenger is not only brought back again rapidly into his normal seated position, but is also securely held in this position in the event of a second collision of the vehicle with an obstacle. In other words, after a primary collision of the vehicle with an obstacle it should be ensured that the passenger then returns as rapidly as possible into his normal seated position again and that in the event of a possible secondary collision of the vehicle with an obstacle a protective effect should be achieved which is at least similar to the original protective effect.

According to the present invention a safety belt apparatus for a motor vehicle is provided. The apparatus comprises a safety belt and; a belt roller which takes up a greater or lesser portion of the belt and is rotatably secured to the vehicle body. The belt roller is pre-tensioned through a torque-producing mechanism in the belt wind-up direction, and includes an unwind-blocking arrangement which blocks the unwinding of the belt against the force of the torque-producing mechanism in the event of an attempt to rapidly draw out the belt. The apparatus also includes a belt deflection apparatus positioned above the shoulder of a passenger who is retained by the safety belt. The deflection apparatus includes a deflection member to which the belt is guided from the belt roller and through which the belt can be deflected so that it approaches the passenger. The safety belt apparatus also includes a belt lock to which the belt extends from the belt deflection apparatus via the passenger and which is secured at a tension member which is attached at the vehicle body.

The deflection member is secured at the vehicle body and is movable by a spring force away from the passenger. The deflection member is normally fixed against the spring force by a retainer mechanism in a retracted normal position; and the retainer mechanism is configured to release the deflection member in the event of an accident causing a tension force in the belt. The apparatus is configured so that when deflection member is released the spring force moves the deflection member abruptly out and a retraction force is exerted at the belt which moves the passenger back into the normal seated position.

As described further below, the present invention satisfies the object set forth above. The present invention provides for the movable arrangement of the deflection member and the acting upon through a spring a considerable retraction force on the order of magnitude of 100 to 300 N becomes effective within a very short time of for example 0.2 to 0.8 sec. after a primary collision, which not only ensures that the passenger is brought back into the normal seated position as rapidly as possible after a primary collision, but in the case of a secondary collision also ensures a similar protective effect as in the primary collision.

Preferably the retraction force or spring force provided after the deflection member is released is at least a factor of ten greater than the normal force exerted by the belt roller. The retraction force is preferably between 100 to 300 N. The retraction force preferably becomes effective within 0.2 to 0.8 seconds of release of the deflection member.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 4 is a schematic front view of the safety belt arrangement in accordance with the invention with a passenger retained by the belt.

DETAILED DESCRIPTION

Figure 1:
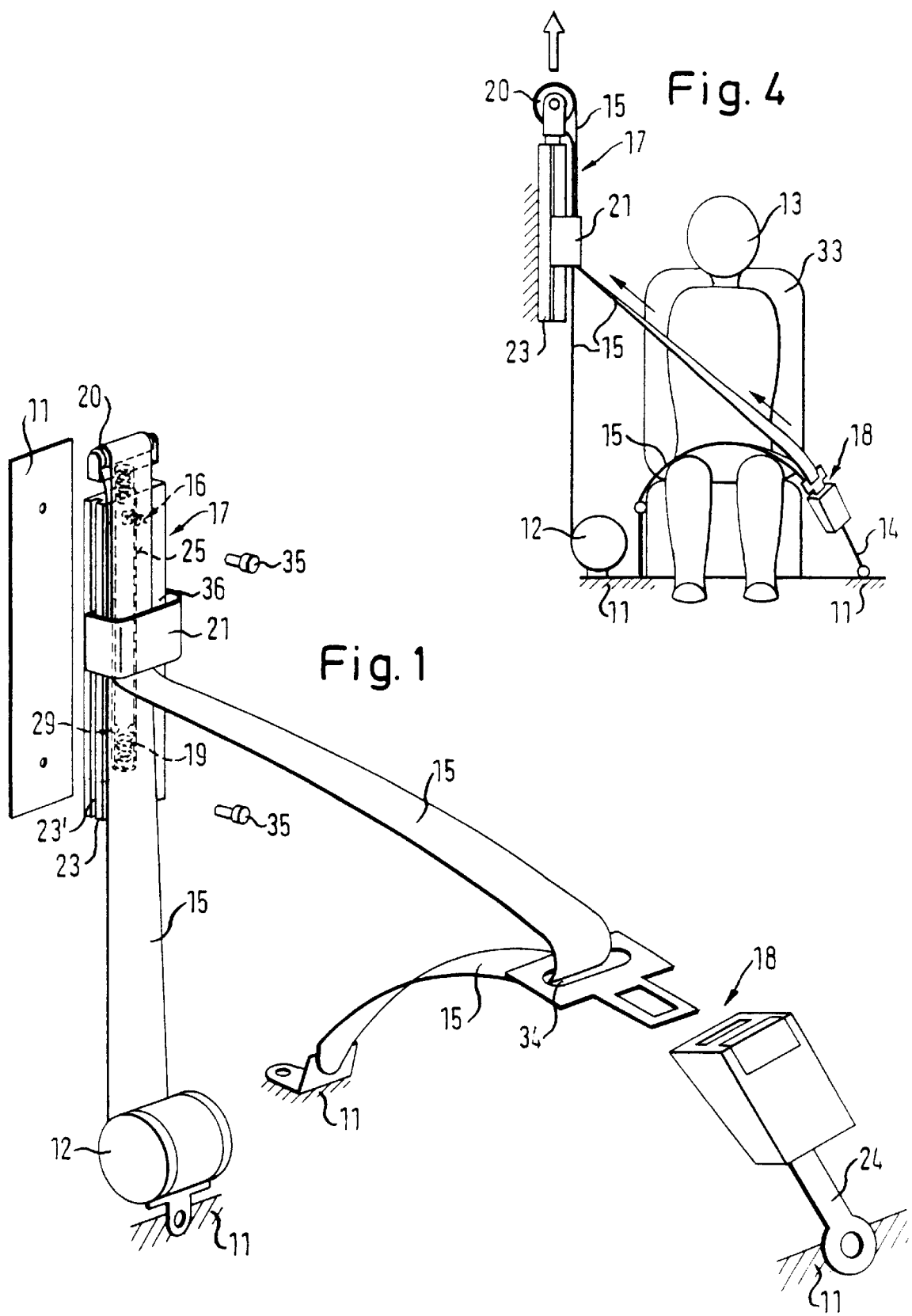
FIG. 1 is a schematic perspective view of a safety belt arrangement in accordance with the invention in the normal, non triggered position, with constructional elements which are arranged in the rail also being indicated.

In accordance with FIG. 4, a passenger 13 who is located on a vehicle seat 33 is retained by a so-called three-point belt arrangement, which consists of a tension member 14 which is secured at the vehicle body 11, a belt lock 18 adjoining thereat and a safety belt 15, which extends from a securing location at the vehicle body 11 which is located adjacently to the seat 33 through an eye 34 (FIG. 1) of the belt lock 18 to a deflection member 21, from which it is led to a deflection roller 20 and is deflected by the latter by approximately 180° and then arrives at a belt roller 12 which is likewise secured at the vehicle body. Together the deflection roller 20 and the deflection member 21 form a belt deflection apparatus 17. The belt roller 12 has a non-illustrated torque-producing mechanism in the form of a spiral spring and an unwind-blocking arrangement which becomes effective in an attempted rapid drawing out of the belt 15 or in the event of accident-caused accelerations.

Figure 2:
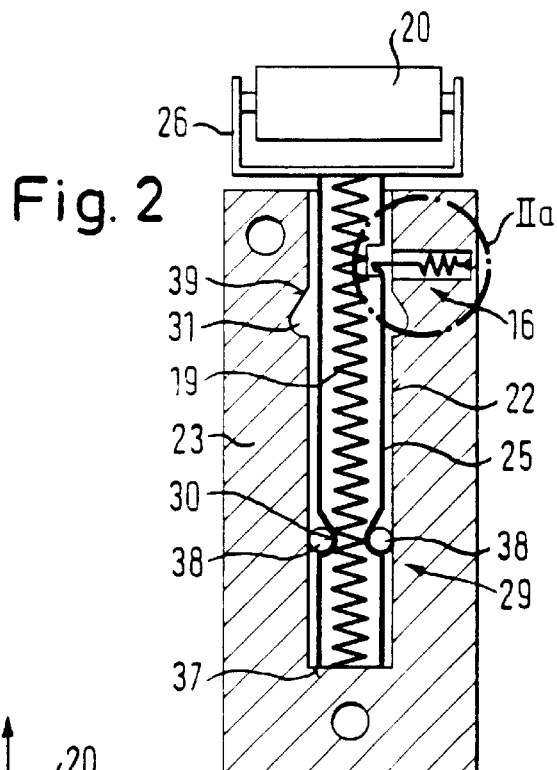
FIG. 2 is an enlarged, partly sectioned side view of the rail which is provided in the embodiment in accordance with FIG. 1.

In accordance with the invention the deflection roller 20 in accordance with FIGS. 1 and 2 is arranged over a frame 26 at a piston 25, which extends from above into an upwardly open, downwardly closed cylinder 22 within a rail 23, which is secured by means of screws 35 (FIG. 1) at the vehicle body 11, in particular at a lateral vehicle column. The piston 25 is hollow and contains a compression spring 19, which is supported below at the cylinder base 37 and acts upon the frame 26 of the deflection roller 20 above.

A belt deflection member 21 engages into lateral grooves 23' of the rail 23 and is height-adjustably secured at the rail 23. The belt deflection member 21 is displaceable into different height positions and can be fixed there.

The two sides of the belt 15 which are formed by the deflection roller 20 extend in front of the rail 23 and through a corresponding opening 36 in the belt deflection member 21.

Figure 2A:
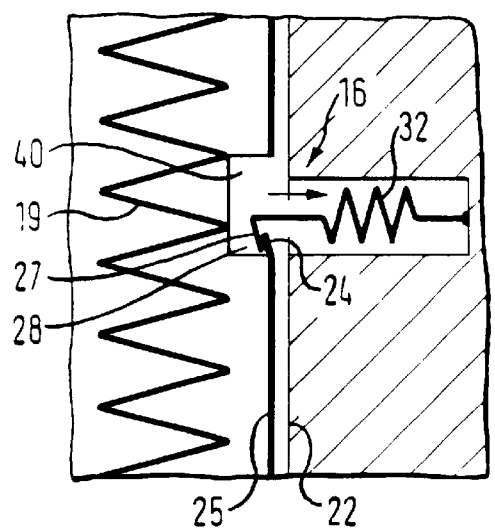
FIG. 2a is the enlarged section IIa of FIG. 2.

In the upper region the piston 25 has laterally a latching depression 28 which is formed in accordance with FIG. 2a and into which a latching pawl 27 engages from the side, and indeed in such a manner that the movement of the piston 25 is upwardly blocked as a result of the spring acting upon the piston 25. For this the latching pawl 27 is formed in the shape of a hook and the latching depression 28 is formed complementarily to it in order that a form fitting between the pawl 27 and the piston 25 is achieved.

The latching pawl 27 is pre-tensioned by a tension spring 32 in the unblocking direction.

In this way, in the pushed forward position of the pawl 27 in accordance with FIGS. 1, 2 and 2a the piston 25 is blocked against moving out by the force of the spring 19. The latching pawl 27 and the latching depression 28 thus form a retainer mechanism 16 for the piston 25 in the retracted normal position in accordance with FIGS. 1, 2 and 2a.

Figure 3:
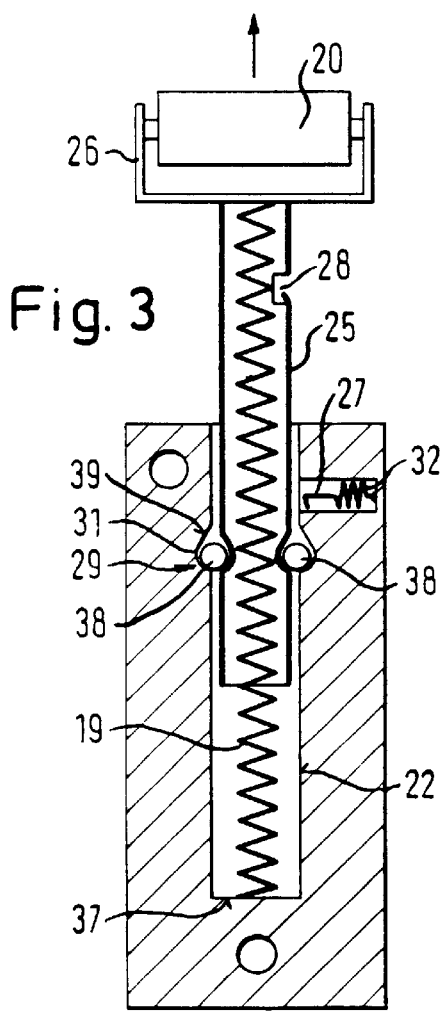
FIG. 3 is a view similar to FIG. 2, however in the moved out state of the deflection member.

In the lower region the piston is provided with a peripheral groove 30 in which blocking balls 38 are accommodated. In the region of the highest position of the piston 25 (FIG. 3), blocking depressions 31, which have inclined surfaces 39 above, face the blocking balls 38 in the cylinder 22, through which it is achieved that the piston 25 can not move back into the cylinder 22 out of the piston in accordance with FIG. 3.

The method of operation of the safety belt apparatus in accordance with the invention is as follows:

In the normal case the passenger 13 is strapped in by means of the three-point belt 15 as indicated in FIG. 4.

In the event of a frontal collision of the vehicle the passenger is thrown forward within a time of approximately 25 msec., with a considerable belt force on the order of magnitude of 100 to 300 N building up. After approximately 50 msec. the vehicle impacting at an obstacle has come to a standstill, and the belt and possibly a belt force limiter which is present are stretched or deformed respectively to their maximum extent.

Now the force of the spring 19 is dimensioned such that as a result of the belt force which arises during the collision the piston 25 moves downward by an amount, through which the latching pawl 27 is freed from the counter-abutment 24 and can be moved out from the latching depression 28 through the tension spring 32. For this a sufficient free space 40 (FIG. 2a) must be present above the pawl 27.

If now after the standstill of the vehicle the deceleration forces decrease and finally vanish, the spring 19 moves the piston 25 out within a relatively short time of 0.2 to 0.8 sec and in so doing exerts a retration force of 100 to 300 N on the safety belt 15, which leads to the passenger 13 being rapidly moved back into the seat 33, where he is then retained with the retraction force which is caused by the spring 19 until a secondary collision possibly takes place. If the tension force at the safety belt 15 exceeds the restoring force of the spring 19 during the secondary collision, the return blocking 29 becomes effective in that the blocking balls 38 are pressed against the inclined surfaces 39 by the blocking depression.

It is thus essential that in a primary collision the piston 25 is moved down downwardly against the force of the spring 19 by such an amount that the retainer mechanism 16 releases the piston 25, so that the latter can move rapidly upwards under the action of the spring 19. In this the force of the spring 19 is greater than the retraction force which is applied by the belt roller 12 by at least a factor of 10.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

The priority document, German Patent Application DE 100 21 382.0 filed May 3, 2001 is hereby incorporated by reference herein in its entirety.

What is claimed is:

1. A safety belt apparatus for a motor vehicle comprising:
   a safety belt for restraining a passenger of the vehicle;
   a pretensioned belt roller including an unwind-blocking arrangement configured to block a rapid unwinding of the belt;
   a belt deflection apparatus including a deflection member to which the belt is guided from the belt roller and through which the belt can be deflected toward the passenger;
   a belt lock secured to the vehicle and positioned so that when the safety belt is in use the belt extends across the passenger from belt deflection apparatus to the belt lock;
   wherein the deflection member is configured to move away from the passenger in response to a foce applied by a spring;
   wherein the deflection member is normally fixed in a retracted position against the spring force by a retainer mechanism;
   wherein the retainer mechanism is configured to release the deflection member in the event that an accident causes a tension force in the belt; and
   wherein the apparatus is configured so that when the deflection member is released the spring force moves the deflection member abruptly out to tension the belt.

2. The safety belt apparatus of claim 1, wherein the deflection member is attached to a piston which is displaceable in a cylinder and which is acted upon by a spring in the moving out direction.

3. A safety belt apparatus for a motor vehicle comprising:
   a safety belt for restraining a passenger of the vehicle;
   a pretensioned belt roller including an unwind-blocking arrangement configured to block a rapid unwinding of the belt;
   a belt deflection apparatus including a deflection member to which the belt is guided from the belt roller and through which the belt can be deflected toward the passenger;

a belt lock secured to the vehicle and positioned so that when the safety belt is in use the belt extends across the passenger from belt deflection apparatus to the belt lock;

wherein the deflection member is configured to move away from the passenger in response to a force applied by a spring;

wherein the deflection member is normally fixed in a retracted position against the spring force by a retainer mechanism;

wherein the retainer mechanism is configured to release the deflection member in the event that an accident causes a tension force in the belt; and wherein the apparatus is configured so that when the deflection member is released the spring force moves the deflection member abruptly out to tension the belt;

wherein the deflection member is attached to a piston positioned in a cylinder, wherein the spring force acts in a direction to move the piston out of the cylinder;

wherein the apparatus is configured so that after the release of the deflection member in the case of an accident the spring force is exerted on the passenger via the belt, wherein the spring force is greater than a force in the wind up direction exerted by the belt roller by at least a factor of ten.

4. The safety belt apparatus of claim 3, wherein the retraction force is between 100 to 300 N.

5. The safety belt apparatus of claim 4, wherein the retraction force becomes effective within 0.2 to 0.8 sec. after the release of the deflection member.

6. A safety belt apparatus for a motor vehicle comprising:

a safety belt for restraining a passenger of the vehicle;

a pretensioned belt roller including an unwind-blocking arrangement configured to block a rapid unwinding of the belt;

a belt deflection apparatus including a deflection member to which the belt is guided from the belt roller and through which the belt can be deflected toward the passenger;

a belt lock secured to the vehicle and positioned so that when the safety belt is in use the belt extends across the passenger from belt deflection apparatus to the belt lock;

wherein the deflection member is configured to move away from the passenger in response to a force applied by a spring;

wherein the deflection member is normally fixed in a retracted position against the spring force by a retainer mechanism;

wherein the retainer mechanism is configured to release the deflection member in the event that an accident causes a tension force in the belt; and wherein the apparatus is configured so that when the deflection member is released the spring force moves the deflection member abruptly out to tension the belt;

wherein the deflection member is attached to a piston positioned in a cylinder, wherein the spring force acts in a direction to move the piston out of the cylinder;

wherein the retainer mechanism is formed by a latching pawl, which engages into a complementary latching depression of the piston and which becomes free at a tension force on the belt which overcomes the spring force and is configured to move away from the piston, so that the piston can be moved by the spring.

7. The safety belt apparatus of claim 6, wherein the latching pawl is displaceable in a direction substantially perpendicular to the direction of piston movement.

8. The safety belt apparatus of claim 7, further comprising a return blocking mechanism which permits the piston to move out of the cylinder but prevents its return movement.

9. The safety belt apparatus of claim 8, wherein, the belt deflection apparatus further comprises a belt deflection member which is height-adjustably attached to the vehicle body and through which the belt is guided to the passenger by a change in direction of substantially 180° after deflection by the deflection member.

10. The safety belt apparatus of claim 9, wherein the piston and cylinder are accommodated in a rail that is secured at the vehicle body.

* * * * *